May 19, 1931. H. A. TUTTLE 1,806,431
REVERSING MECHANISM
Filed Dec. 28, 1929 3 Sheets-Sheet 3

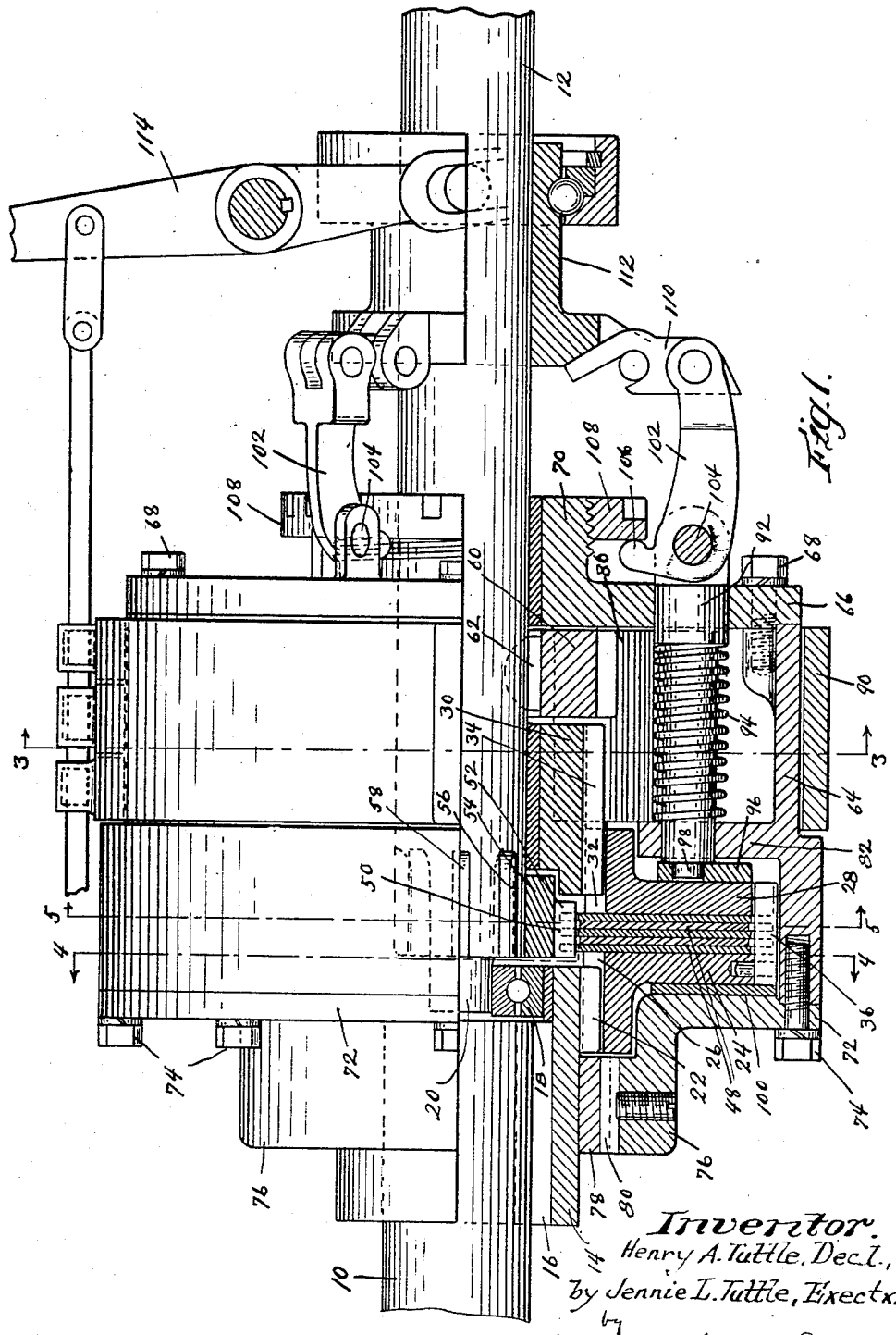

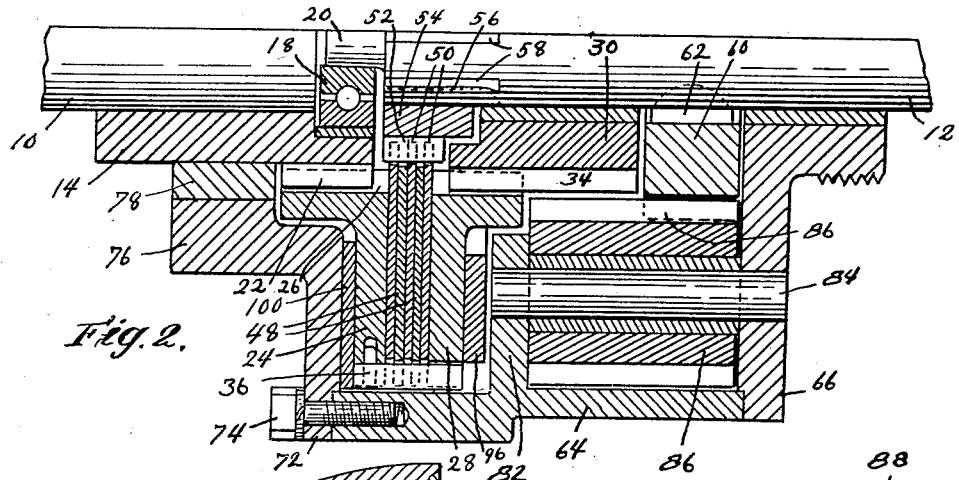
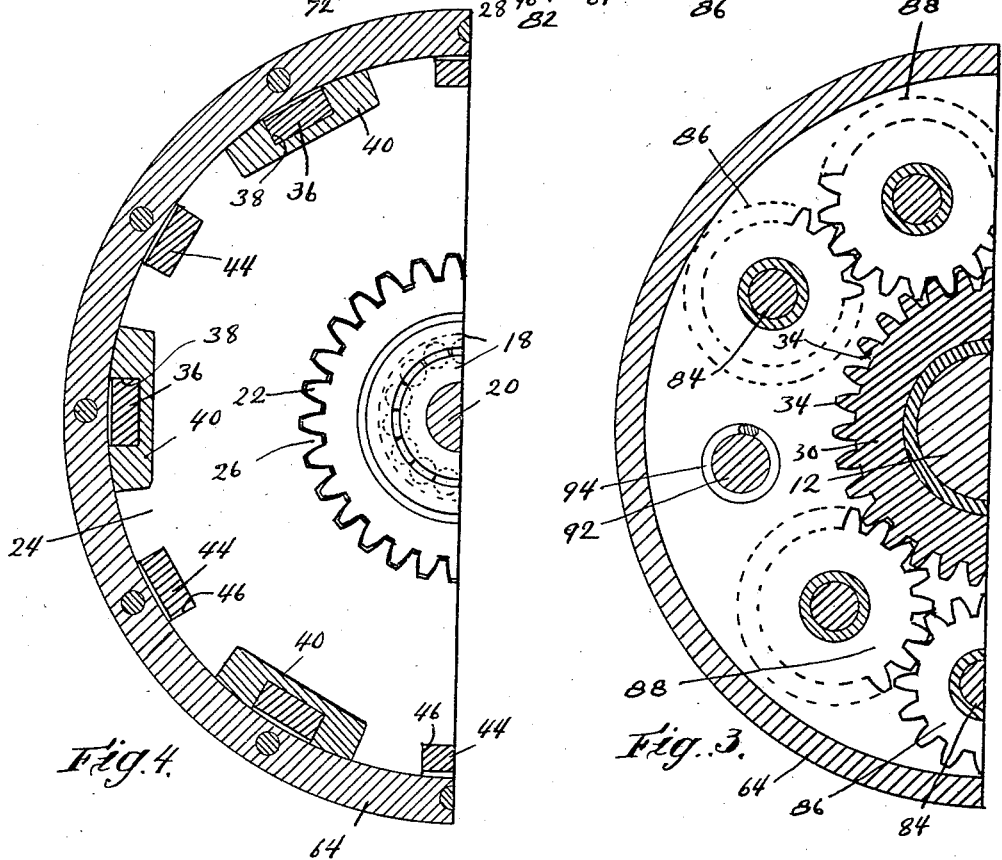

Inventor.
Henry A. Tuttle, Decd.,
by Jennie L. Tuttle, Exectx.,

Patented May 19, 1931

1,806,431

UNITED STATES PATENT OFFICE

HENRY A. TUTTLE, DECEASED, LATE OF UPTON, MASSACHUSETTS, BY JENNIE L. TUTTLE, EXECUTRIX, OF UPTON, MASSACHUSETTS

REVERSING MECHANISM

Application filed December 28, 1929. Serial No. 417,246.

This invention relates to reversing mechanisms especially adapted, although not necessarily restricted, to boat propulsion and is of the type wherein clutch mechanism is employed directly to connect driving and driven shafts for forward drive and planetary gearing is employed to connect the shafts for reverse drive.

One of the objects of the present invention is to provide an improved reversing mechanism of the general type above set forth that is assembled mainly on the driven shaft and can be placed in position about the driving shaft and connected operatively thereto by a forward movement of the gearing and the driven shaft.

Another object of the invention is the provision of a reversing mechanism of the type above set forth wherein the clutch mechanism has an axially movable and disengageable driving connection both with the driving shaft and with a gear element of the reversing gearing.

Another object of the invention is the provision of reversing mechanism carried mainly by the driven shaft and having a clutch mechanism that has a positive driving engagement both with the driving shaft and with a driving element of the reversing gearing, the driving connection having a limiting freedom of movement so that the shafts can be angularly displaced without reducing the effectiveness of the clutch mechanism.

A further object is generally to improve the construction and operation of reversing mechanisms.

Fig. 1 is a side elevation, partly in section, of a reversing gearing embodying the present invention, the section being taken through one of the clutch-operating pins.

Fig. 2 is a section of the gearing of Fig. 1 taken through one of the small pinion gears of the reversing mechanism.

Fig. 3 is a section taken along line 3—3 of Fig. 1.

Fig. 4 is a section taken along line 4—4 of Fig. 1.

Figure 5:
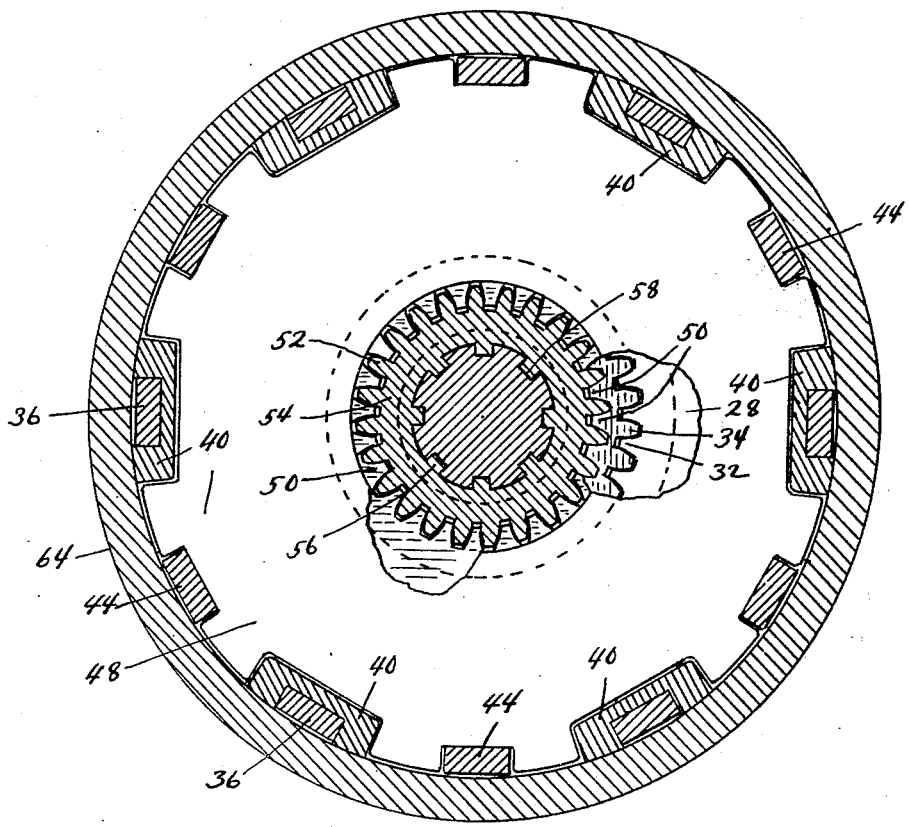
Fig. 5 is a section taken along line 5—5 of Fig. 1.
Figure 6:
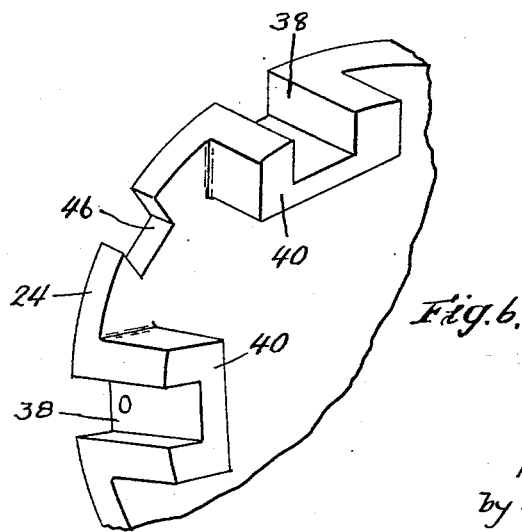
Fig. 6 is a partial perspective view of the front wall of the clutch plate carrier.

The reversing gearing here shown includes the driving shaft 10 and the driven shaft 12 which is aligned with the driving shaft. A hub 14 is secured to the rear end of the driving shaft by suitable means as the key 16 and has its rear hand end, Fig. 1, extended beyond the end of the driving shaft and internally recessed to receive the pilot ball bearing 18 which supports the reduced forward end 20 of the driven shaft. The rear end of the hub 14 is provided with a plurality of axially-extended peripherally outstanding keys or splines 22 which, as here shown, see especially Fig. 4, are in the form of external gear teeth and provide an axially loose positive driving connection with a clutch casing or clutch plate carrier.

The clutch plate carrier includes a front plate or wall 24 which outstands radially beyond the hub 14 and is provided with a series of splines, here shown as internal gear teeth 26, which mesh with the gear teeth 22 of the hub and thereby establish a positive driving connection between said plate and the hub and consequently with the driving shaft permitting the plate to move axially and preferably also, slightly angularly. A rear casing plate or wall 28 is axially spaced from and parallel with the plate 24 and surrounds the driven shaft and a pinion gear 30 which is rotatably loose on said driven shaft and constitutes one of the elements of the reverse gearing presently to be described.

Said rear wall 28 is provided with splines 32 here shown as internal gear teeth which mesh with the external gear teeth 34 of the loose gear 30 so that said plate and gear are free for relative axial movement while maintaining the driving connection between them. The plates or walls 24 and 28 of the clutch casing have means providing a positive driving connection between them while permitting relative axial movements of said walls, and, in particular, axial movement of the rear wall relative to the front wall. Said means includes a plurality of axially extended keys 36 which are spaced about the periphery of both walls and are secured snugly in axially extended slots 38 in rearwardly extended portions or lugs 40 of said front plate 24 and are secured therein in any suitable manner as by the pins 42. The rear wall 28 is provided with notches in which the rear ends of said keys 36 are loosely received whereby said rear wall is constrained to rotate with said front wall and yet can move axially with respect thereto, the length of the lugs 40 being short enough to permit whatever axial movement of the rear wall is necessary. Other keys 44 are received in notches 46 in the periphery of the front wall 24 between the keys 36 and are secured therein in a similar manner and have their rear ends loosely received in peripheral slots of the rear wall 28. A plurality of clutch plates 48 are located in the space between the front and rear walls and alternate plates have notches in their outer periphery which fit loosely over the keys 44 and thereby establish driving connection between the clutch plate carrier and said plates while permitting the plates to move axially. The other alternate plates are provided at their inner peripheries with inwardly extended splines here shown as internal gear teeth 50 which mesh with external splines or gear teeth 52 of a clutch plate hub 54 which is carried by the driven shaft 12 and has internal splines 56, see especially Fig. 5, which are received in spline ways 58 formed in the forward end of the driven shaft, whereby to provide a positive driving connection between said hub and the driven shaft. In accordance with this arrangement, when the walls of the clutch plate carrier are moved toward each other and compress the clutch plates between them, a direct driving connection is established between the driving and the driven shafts.

The construction of the clutch plate carrier wherein the front and the rear walls are positively connected together while permitting relative axial movement therebetween is described and claimed in a copending application Serial No. 377,046, filed July 9, 1929.

Reversing gearing is provided to connect the driving and driven shafts through the clutch plate carrier for reverse drive. To this end a driven spur gear 60 is fixed to the driven shaft 12 by a key 62 and is located immediately in the rear of the loose driving gear 30. Said gears are adapted to be connected together through planetary gearing elements carried by a pinion gear carrier which includes a cylindrical casing or drum 64 which surrounds the aforesaid pinion gears and also the clutch plate carrier.

Said drum is provided with an end wall comprising a plate 66 that is secured to the rear face of the drum by means of bolts 68 and has a hub 70 which is freely rotatably supported and is axially loose on the driven shaft 12. The forward end of the drum is closed by an end plate 72 which is secured to the drum by bolts 74 and has a forwardly extended hub 76 that is provided with an internal passage in which a bushing 78 is removably located and which is rotatably fixed to the hub by a key 80 and is axially loose on the gear hub 14. The outside diameter of said bushing 78 is adapted to be somewhat larger than the outside diameter of the gear teeth 22 so that said hub 76, free from said bushing, can pass over said gear teeth when moved axially for the purpose of assembling or disassembling the reversing mechanism.

The drum 64 is provided with a radially-inwardly directed flange 82 which is located immediately at the rear of the clutch plate carrier. Pinion-supporting pins 84 are extended through the rear wall 66 and said flange 82 and provide supports for small pinion gears 86 which mesh with the driven spur gear 60 and the large pinion gears 88 which mesh with the aforesaid pinion gears 86 and with the driving spur gear 30.

The gear is conditioned for reverse drive by holding the pinion gear carrier 64 stationary and to this end a brake band 90 is provided which is adapted to be contracted into frictional engagement with the pinion gear carrier in a common manner whereby to hold it stationary.

The clutch mechanism is set for forward drive by means of operating mechanism which includes thrust pins 92 which are extended axially through the pinion carrier casing between the sets of planetary pinion gears and are slidably supported in the rear wall 66 and the flange 82. Compression springs 94 encircle said pins and bear against said flange 82 and the enlarged rear portion of said pins whereby to urge the pins rearwardly and thus permit the clutch plates to free themselves when the clutching pressure is removed therefrom and also to prevent movement of said pins in a clutch setting direction due to centrifugal force acting upon the pin-operating links presently to be described. The forward ends of said pins bear against a pressure ring 96 which bears against the rear face of the rear wall 28 of the clutch plate carrier and is carried by said pins against rotation relative therewith by means of the reduced ends 98 of said pins which fit loosely in passages in said ring. The pressure ring has a frictional engagement with the wall 28 of the clutch plate carrier and, in itself, constitutes a clutch member which serves to clutch the pinion gear carrier to the clutch plate carrier, and thus to the driving shaft, so as to prevent backlash of the elements of the reversing gearing during forward drive. The operation of the clutch operating mechanism not only moves the clutch plate carrier forwardly but also moves the pinion gear carrier or casing rearwardly so that the front wall 24 of the clutch plate carrier and the front wall 72 of the planetary gearing carrier are brought into frictional engagement through an interposed plate 100 thereby to provide additional frictional driving engagement between the planetary gearing carrier and the driving shaft during forward drive.

The thrust pins 92 are operated by links 102 which are located in slots in the rear ends of said pins and are pivoted thereto by pins 104. Said links have inwardly directed toes 106 which bear against the front face of a thrust ring 108 screw threaded on the external screwthreads of the hub 70. The rear ends of said links 102 are connected through toggle links 110 with a sleeve 112 which is axially slidable on the driven shaft 12 under urge of an operating lever 114 and controls the action of the mechanism in the usual manner.

With the construction above described most of the parts can be slid into and out of engagement with each other without the necessity for removing bolts and the like. The pinion gear carrier is clutched to the driving shaft when the mechanism is set for forward driving whereby to prevent backlash of the planetary gearing elements due to play between their intermeshing teeth. The clutch plate carrier is free for axial movement on the driving shafts so that it can be readily engaged and disengaged therewith and also so that it can frictionally engage the clutch plate carrier. The movable driving connections between the clutch and its driving and driven members is also such that the driving and driven shafts can have a limited amount of angular displacement without reducing the effectiveness of the frictionally engageable elements of the clutch mechanism, or preventing their engagement over their full coacting friction surfaces. The gearing can be assembled mainly on the driven shaft and brought into proper engagement with the driving shaft by a forward movement, the hub 76 passing freely over the gear teeth 22 and becoming seated on the bushing 78.

What is claimed is:

1. Reversing mechanism having the combination of axially aligned driving and driven shafts, a clutch plate carrier having spaced confronting plates one of which is carried by and has a flexible driving connection with said driving shaft, clutch plates located between said carrier plates some of which are connected with said carrier and others of which are connected with said driven shaft, means to effect the engagement of said clutch plates to connect said shafts directly for forward drive, reversing gearing connecting said other plate of said clutch plate carrier and said driven shaft, and means to condition said reversing mechanism for reverse drive.

2. Reversing mechanism having the combination of aligned driving and driven shafts, clutch mechanism connecting said shafts directly for forward drive including a clutch plate carrier having spaced confronting plates one of which is carried by and has an axially movable driving connection with said driving shaft, clutch plates located between said carrier plates some of which are connected with said carrier and others of which are connected with said driven shaft, means to effect the engagement of said clutch plates to connect said shafts for conjoint rotation, a gear driven by said other plate of said clutch plate carrier, a gear fixed to said driven shaft, planetary gearing elements connecting said clutch plate carrier and said gear, and means to condition said gearing for reverse drive.

3. Reversing mechanism having the combination of aligned driving and driven shafts, clutch mechanism connecting said shafts directly for forward drive including a clutch plate carrier having spaced confronting plates one of which is carried by and has an axially movable driving connection with said driving shaft, clutch plates located between said carrier plates some of which are connected with said carrier and others of which are connected with said driven shaft, means to effect the engagement of said plates for connecting said shafts for conjoint rotation, reversing gearing connecting said shafts for reverse drive including a gear rotatably loose on said driven shaft and having an axially movable driving connection with the other plate of said clutch plate carrier, planetary gearing elements connecting said gearing and said driven shaft, and means to condition said gearing for reverse drive.

4. Reversing mechanism having the combination of aligned driving and driven shafts, clutch mechanism connecting said shafts directly for forward drive including a clutch plate carrier having a splined driving connection with said driving shaft whereby it is axially movable thereon, clutch plates some of which have a driving connection with said carrier and others of which have a driving connection with said driven shaft, means to effect the engagement of said clutch plates to secure forward drive, reversing gearing connecting said shafts for reverse drive including a gear loose on said driven shaft and having a splined driving connection with said clutch plate carrier, a gear fixed to said driven shaft, planetary gearing elements connecting both aforesaid gears, and means to condition said reversing gearing for reverse drive.

5. Reversing mechanism having the combination of aligned driving and driven shafts, a hub fixed to said driving shaft, a gear loose on said driven shaft, a clutch plate carrier having a splined driving connection with both said hub and gear, a clutch plate hub located between said first hub and said loose gear and having a splined connection with said driven shaft, clutch plates located within said carrier some having a driving connection with said carrier and others having a driving connection with said clutch plate hub, means to effect the engagement of said clutch plates to secure forward drive, a gear fixed to said driven shaft in the rear of said loose gear, planetary pinion gears connecting both aforesaid gears, a carrier for said pinion gear, and means to hold said carrier stationary to secure reverse drive.

6. Reversing mechanism having the combination of aligned driving and driven shafts, clutch mechanism connecting said shafts for forward drive including a hub fixed to said driving shaft, a gear loose on said driven shaft, a clutch plate carrier surrounding both said hub and said gear and having front and rear walls that have splined connections respectively with said hub and said gear, clutch plates located within said carrier some having a driving connection with said carrier and others having a driving connection with said driven shaft, means to effect the engagement of said clutch plates for forward drive, and reversing gearing connecting said driven shaft and said loose gear to connect said shafts for reverse drive.

7. Reversing mechanism having the combination of aligned driving and driven shafts, clutch mechanism connecting said shafts for forward drive including a clutch plate carrier having a front wall carried by and provided with a splined connection with said driving shaft by which said plate is axially movable on said shaft and a rear wall having a driving connection with said front wall by which it is axially movable with respect thereto, clutch plates located within said walls some of which plates have a driving connection with said walls and others of which plates have a driving connection with said driven shaft, means to move said walls toward each other to effect the engagement of said clutch plates for forward drive, and planetary gearing connecting said rear wall and said driven shaft for reverse drive.

8. Reversing mechanism having the combination of aligned driving and driven shafts, clutch mechanism connecting said shafts for forward drive including a clutch plate carrier having axially spaced front and rear walls which have a positive driving connection therebetween which admits of relative axial movement of said walls, said front wall having an axially-movable positive driving connection with said driving shaft, clutch plates located between said walls some of which have a positive driving connection with at least one of said walls and others of which have a driving connection with said driven shaft, means to move said walls toward each other to effect the engagement of said clutch plates for forward drive, and reversing gearing connecting said shafts for reverse drive including a gear loose on said driven shaft and having a splined connection with said rear wall, a gear fixed to said driven shaft, planetary gearing elements connecting both aforesaid gears, and means to condition said gearing for reverse drive.

9. Reversing mechanism having the combination of aligned driving and driven shafts, clutch mechanism connecting said shafts for forward drive including a hub fixed to said driving shaft and having external gear teeth, an external gear loose on said driven shaft, a clutch plate carrier having front and rear walls provided with internal gear teeth which mesh respectively with the teeth of said driving and loose gears and are carried thereby and are free for axial movement thereon, means providing a positive driving connection between said walls which admits of relative axial movement therebetween, clutch plates located between said walls some of which have a driving connection with said walls and others of which have a driving connection with said driven shaft, and planetary gearing connecting said loose gear and said driven shaft for the reverse drive of said driven shaft.

10. Reversing mechanism including the combination of a driving shaft, a driven shaft which is aligned with said driving shaft and which is of uniform diameter except at its forward end where it is reduced in diameter, a hub fixed to said driving shaft and overlying the reduced end of said driven shaft, an anti-friction bearing located within said hub and providing a rotatable support for the reduced end of said driven shaft, a clutch plate hub carried by said driven shaft in the rear of said reduced end and having a splined connection with said driven shaft and being removable therefrom by movement axially of said shaft, a gear loose on said driven shaft in the rear of said clutch plate hub, a gear fixed to said driven shaft in the rear of said loose gear, planetary pinion gears connecting said loose and fixed gears, a pinion gear carrier surrounding said gears and having a rotatable support on said driven shaft, means to hold said pinon gear carrier stationary to secure reverse drive of said driven shaft, a clutch plate carrier having a front wall which has an axially movable driving connection with said fixed hub and having a rear wall which has an axially movable driving engagement with said loose gear, means positively connecting said front and rear walls for relative axial movement, clutch plates located between said walls some of which plates have a driving connection with said walls and others of which plates have a driving connection with said clutch plate hub, and means to move said walls axially toward each other to effect the engagement of said clutch plates for forward drive.

11. Reversing mechanism having the combination of aligned driving and driven shafts, a hub fixed to said driving shaft having external splines at its rear end, a spur gear loose on said driven shaft, clutch mechanism for connecting said shafts for forward drive including a clutch plate carrier having a front wall which has an axially movable driving connection with said splines and a rear wall which has a driving connection with said loose gear, clutch plates connecting said walls and said driven shaft for forward drive, a gear fixed to said driven shaft, planetary pinion gears connecting said loose and fixed gears for reverse drive, an enclosing casing surrounding said gears and said clutch plate carrier and constituting a carrier for said pinion gears, means to hold said carrier stationary to secure reverse drive, said carrier having a rear wall which has a rotatable support on said driven shaft and a front wall which has a removable bushing therein that is rotatably supported on said driving hub forward of said splines, said bushing being larger in diameter than said splines whereby said front wall can be moved rearwardly over said bushing and said splines.

12. Reversing mechanism having the combination of aligned driving and driven shafts, clutch mechanism connecting said shafts for forward drive including an axially movable clutch plate carrier having an axially movable driving connection with said driving shaft and having clutch plates connecting said carrier and said driven shaft, reversing gearing connecting said shafts for reverse drive including planetary gearing elements connecting said driven shaft and said clutch plate carrier, a carrier for said planetary gearing elements constituting an axially movable casing which overlies said clutch plate carrier and has a forward front wall which confronts said clutch plate carrier, and means to condition said clutch mechanism for forward drive including means to move said clutch plate carrier and said casing axially in opposite directions into frictional driving engagement.

In testimony whereof, I have signed my name to this specification.

JENNIE L. TUTTLE,
*Executrix of the Estate of Henry A. Tuttle, (Deceased).*